N. Orcutt.
Paddle Wheel.
N° 22,688. Patented Jan. 18, 1859.
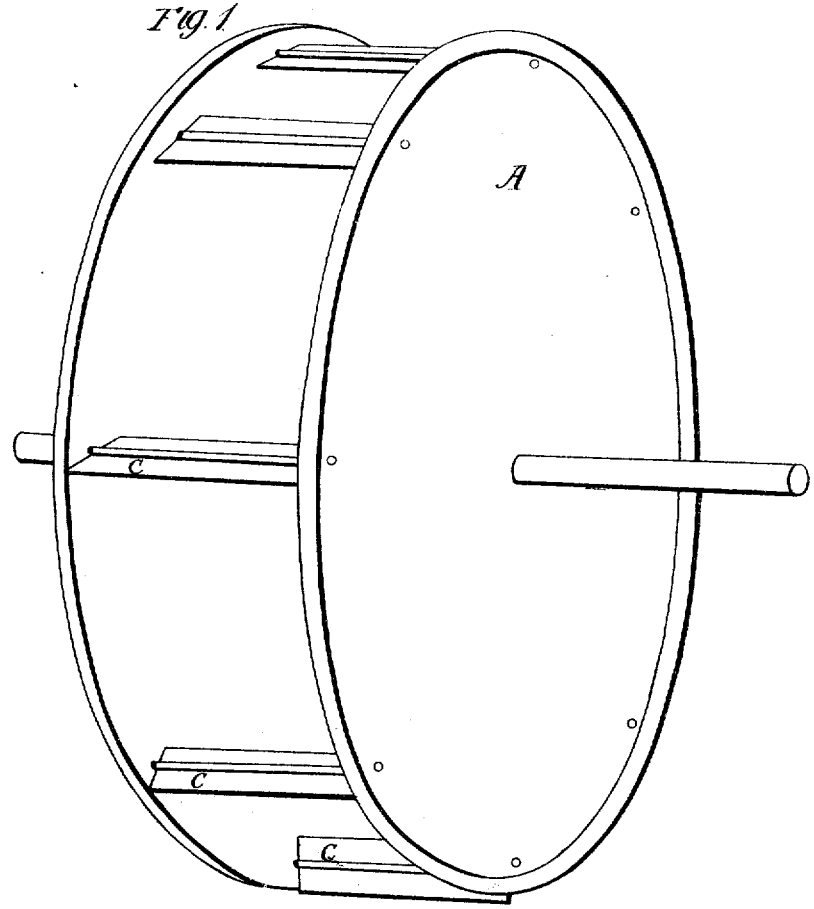
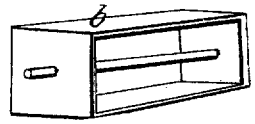
Witnesses
Geo. W. Gregory
77 Everett
Inventor:
Nelson Orcutt

UNITED STATES PATENT OFFICE.

NELSON ORCUTT, OF BINGHAMTON, NEW YORK, ASSIGNOR TO HIMSELF AND
G. W. GREGORY, OF SAME PLACE.

IMPROVED PADDLE-WHEEL.

Specification forming part of Letters Patent No. 22,688, dated January 18, 1859.

*To all whom it may concern:*

Be it known that I, NELSON ORCUTT, of Binghamton, Broome county, in the State of New York, have invented a new and useful Improvement in the Mode of Constructing Paddle-Wheels for Propelling Vessels or Motor-Wheels for Machinery; and I do hereby declare that the following is a full and exact description thereof, reference being had to the accompanying drawings, and to letters of reference marked thereon.

The nature of my invention consists in providing a revolving paddle or bucket, to be attached to the frame-work of the wheel in such a manner as to answer all the purposes of the common or stationary paddle, and at the same time to prevent the lifting of the water as they leave their propelling direction, thus securing the advantage of raising the vessel when they strike the surface and obviating the disadvantage of depressing it when they come out of the water.

It also consists in so arranging said paddles or buckets as to make them applicable to the common water-wheel for propelling machinery, &c.

To enable others skilled in the art to make and use my invention, I will proceed to describe its construction and operation.

Figure 1 is a perspective view of the wheel; Fig. 2, the revolving paddle or bucket; Fig. 3, an end view of the paddle; Fig. 4, the revolving double paddle, which can be used in the same wheel.

I construct my wheel in any of the known forms so far as the disks or arms are concerned, and also attach them in a similar manner to the shaft. The paddle C, Fig. 2, I make of boiler-iron or any other suitable material and securely attach it to the shaft $e$, the ends of which are turned and fitted into the disks or arms A, Fig. 1, of the wheel, so that they can revolve freely upon their axes. When the paddles C C C approach the surface of the water, their edges will have a tendency to enter first, which obviates the concussion caused by the striking of the ordinary bucket with its flat surface upon the water. They will, however, immediately after entering the water adjust themselves by means of the resistance of the water, so as to present their full surface and remain in that position until they commence rising, when they turn again upon their axes by their change of position in the water and pass out in a vertical direction, thus obviating the oblique action on the rising side of the wheel and consequent depression of the vessel.

What I claim as my invention, and desire to secure by Letters Patent, is—

The centrally-suspended paddle or bucket without any stop, means, difference of area or of weight, for holding it in a working position, but left entirely to the action of the forces exerted upon it during the revolution of the wheel, as herein set forth.

NELSON ORCUTT.

Witnesses:
GEO. W. GREGORY,
T. T. EVERETT.